Aug. 5, 1958 W. G. HARR 2,845,663
FOLDING TRAILER BODY
Filed Dec. 11, 1956 6 Sheets-Sheet 1
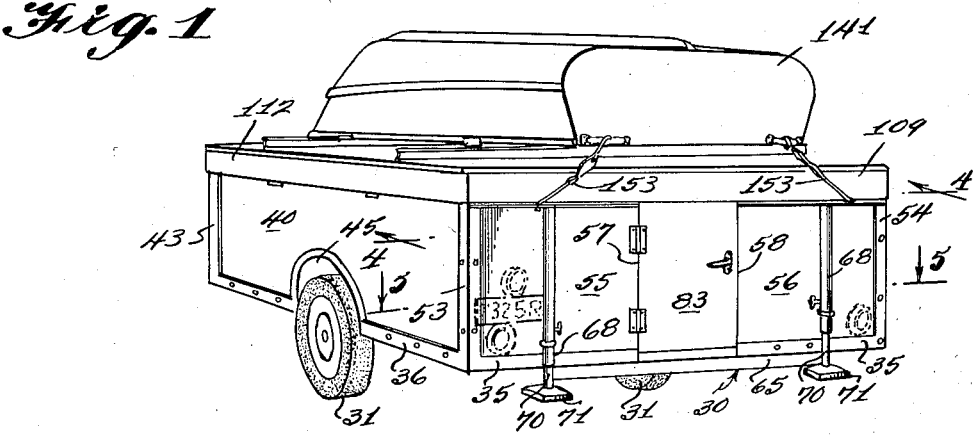
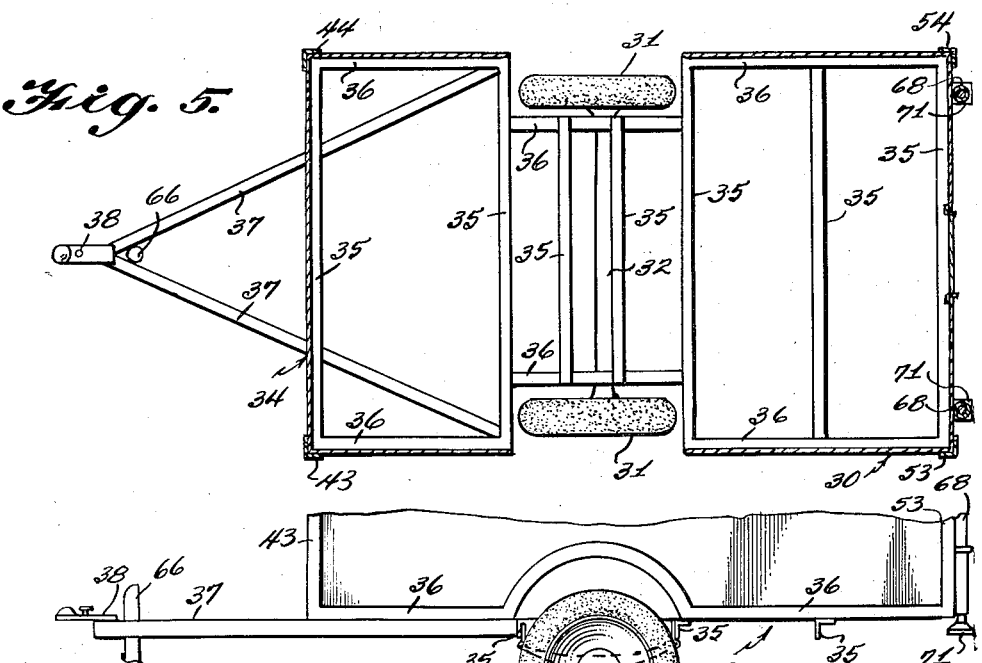
INVENTOR
WILBUR G. HARR
BY Kimmel & Crowell
ATTORNEYS Aug. 5, 1958  W. G. HARR  2,845,663
FOLDING TRAILER BODY
Filed Dec. 11, 1956  6 Sheets-Sheet 2
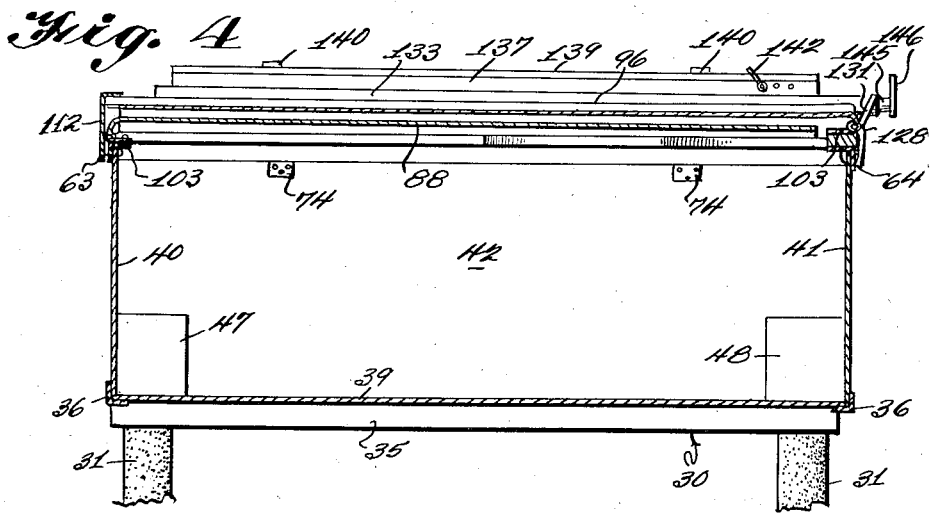
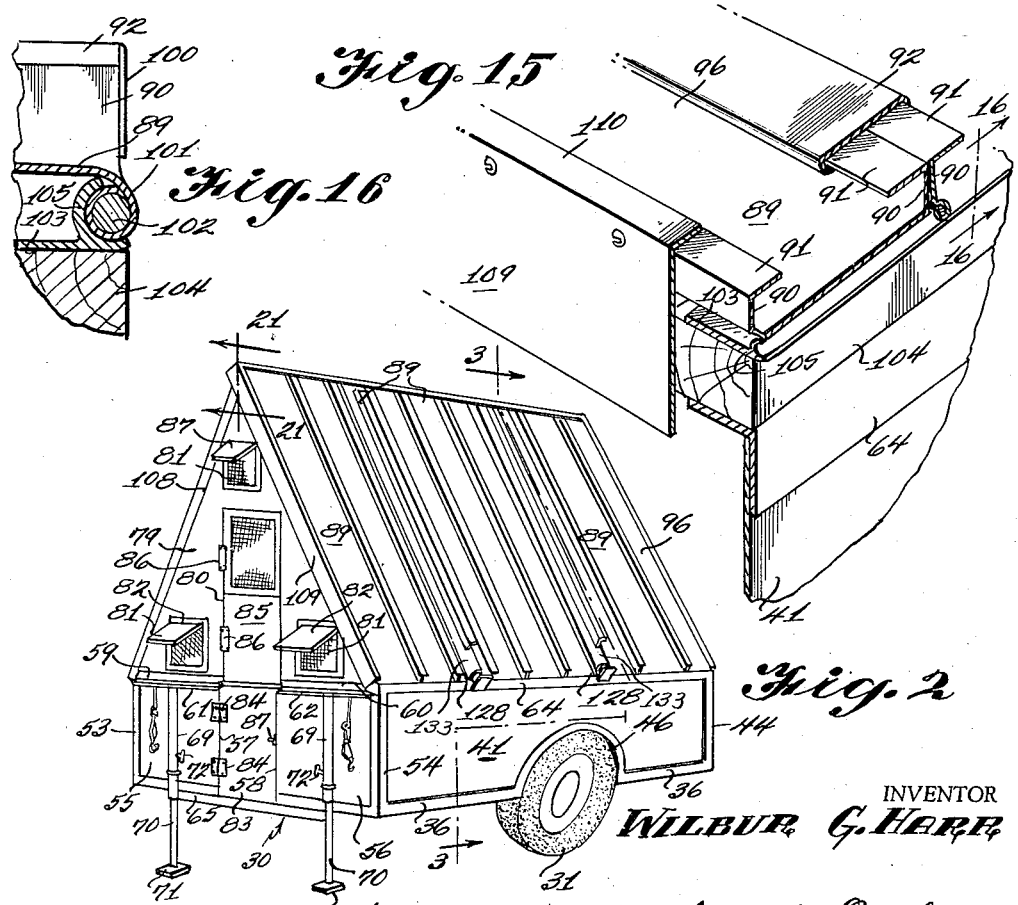
INVENTOR
WILBUR G. HARR
BY Kimmel & Crowell
ATTORNEYS

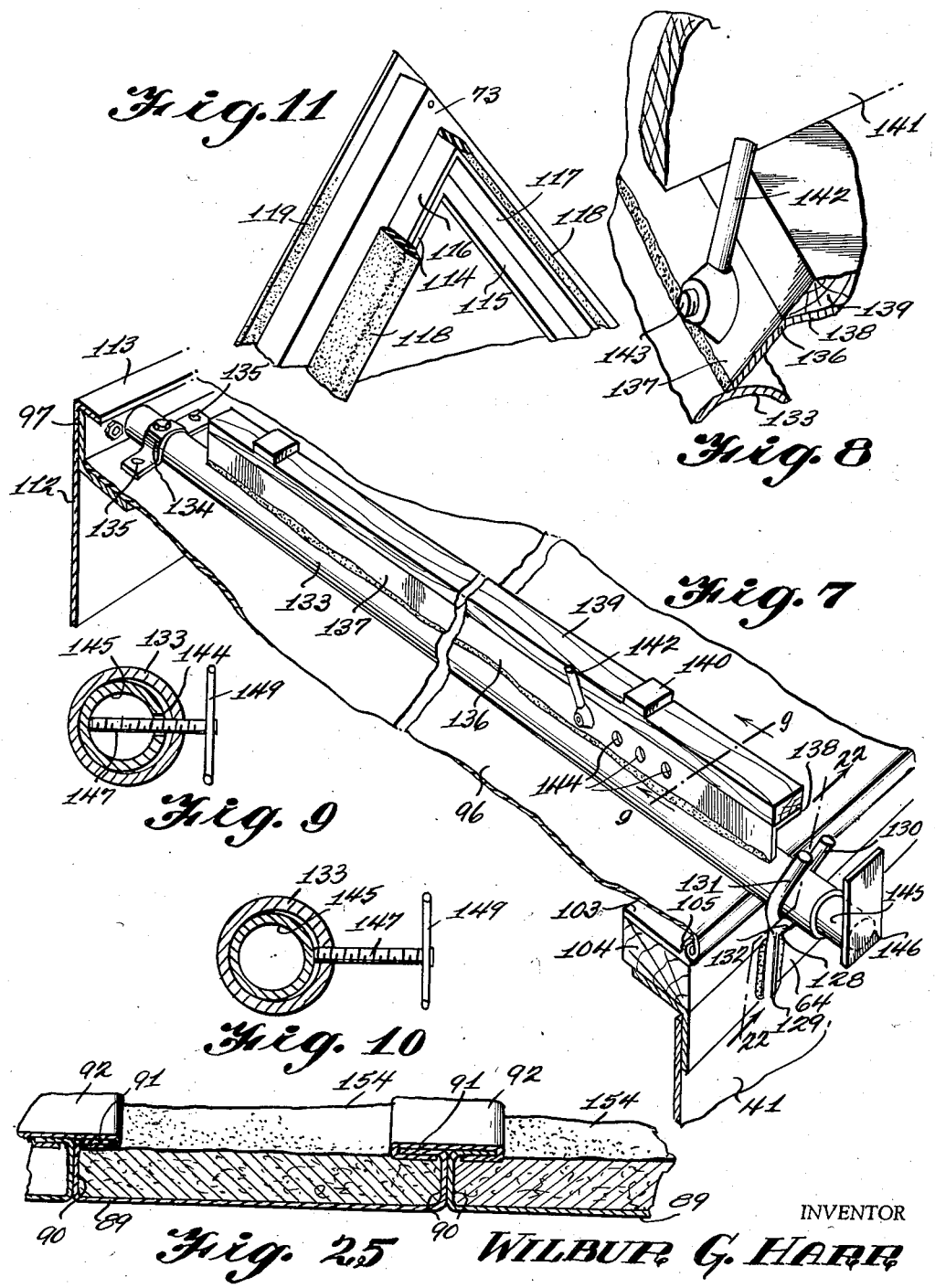

Aug. 5, 1958  W. G. HARR  2,845,663
FOLDING TRAILER BODY
Filed Dec. 11, 1956  6 Sheets-Sheet 4
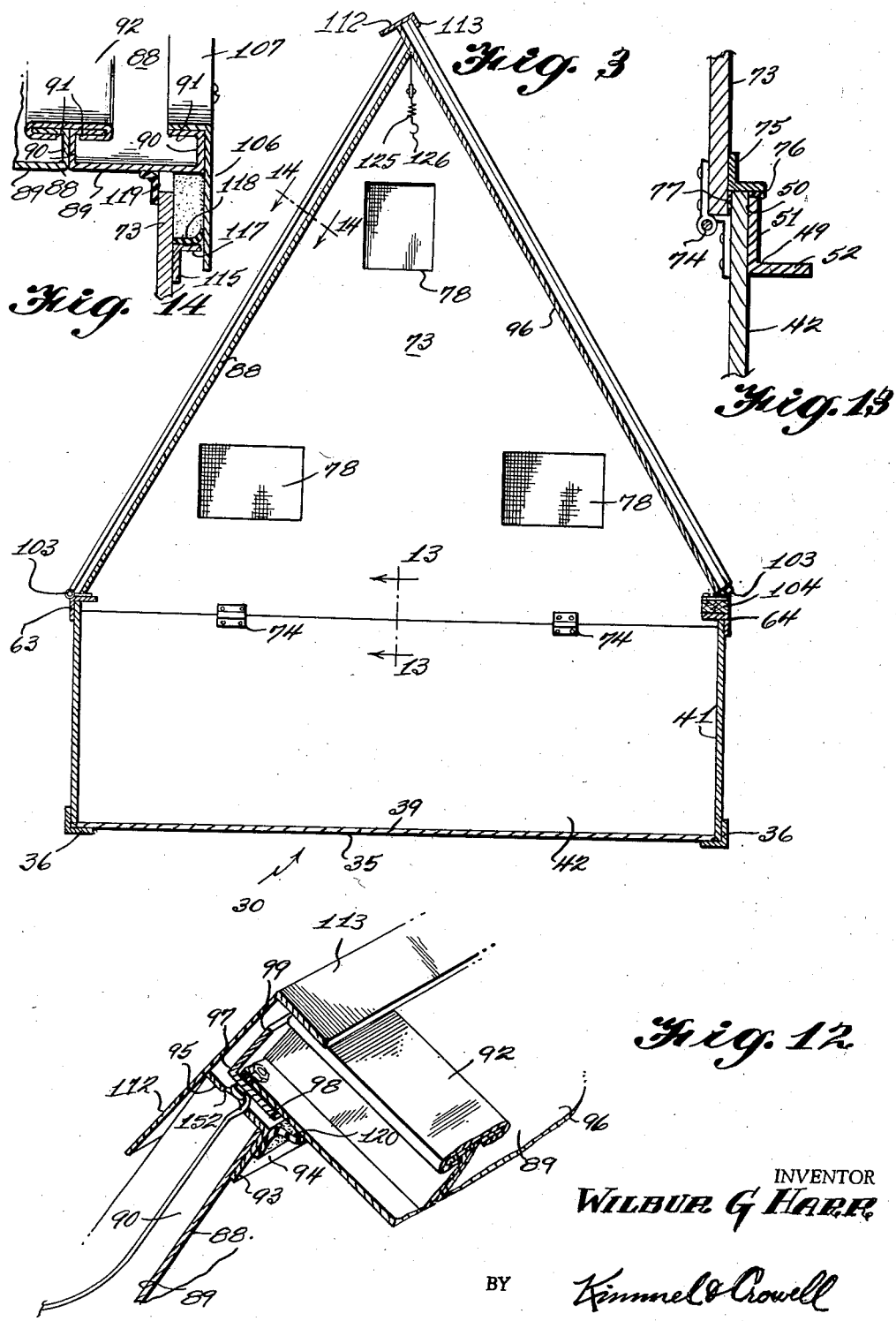
INVENTOR
WILBUR G. HARR
BY
Kimmel & Crowell
ATTORNEYS

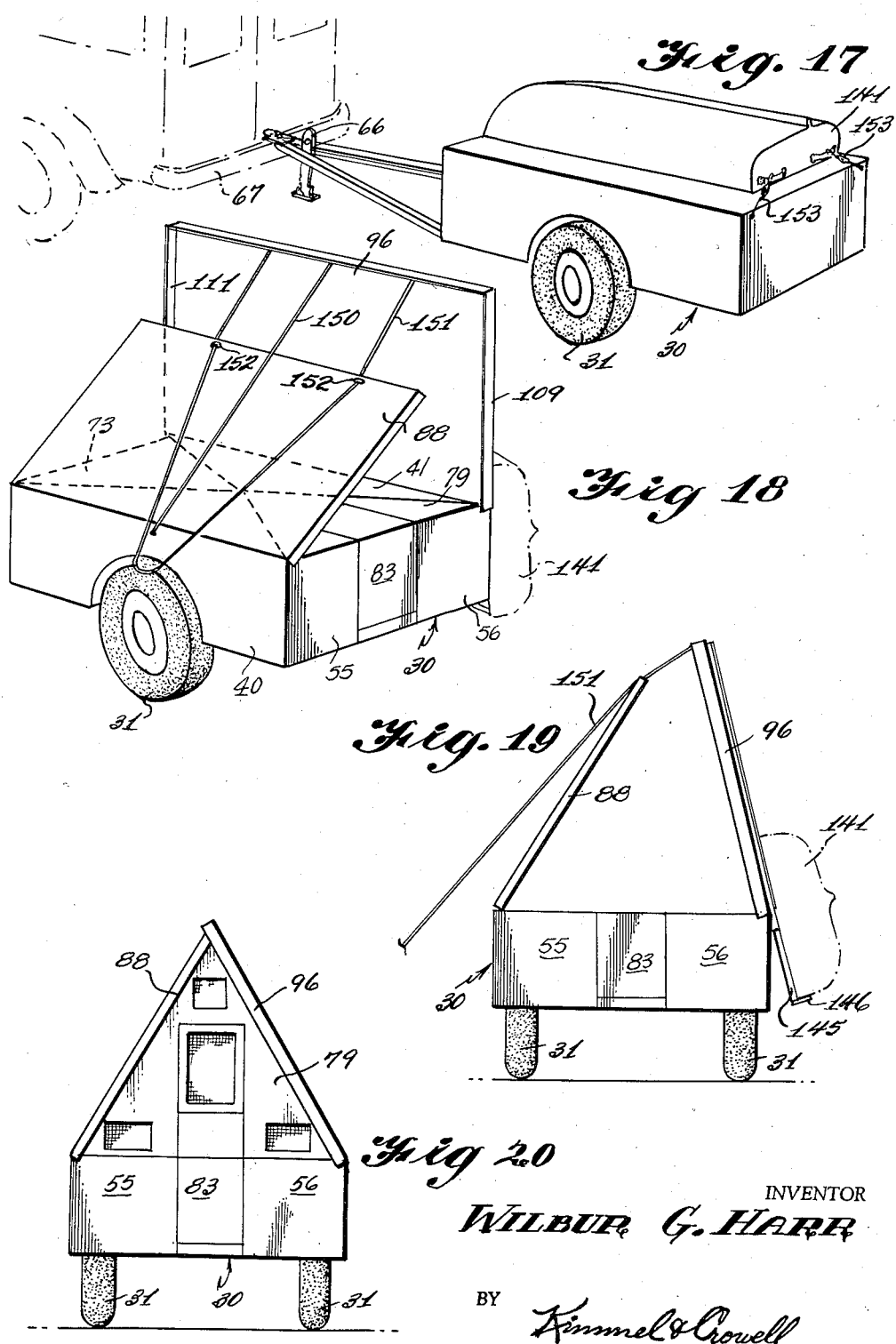

Aug. 5, 1958  W. G. HARR  2,845,663
FOLDING TRAILER BODY
Filed Dec. 11, 1956  6 Sheets-Sheet 6
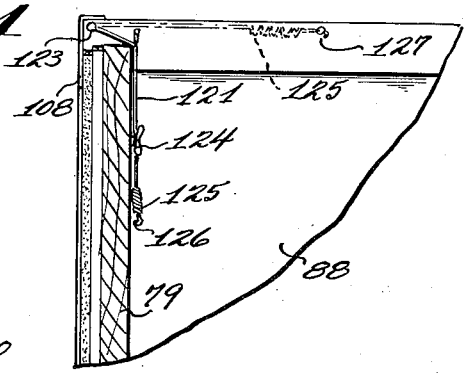
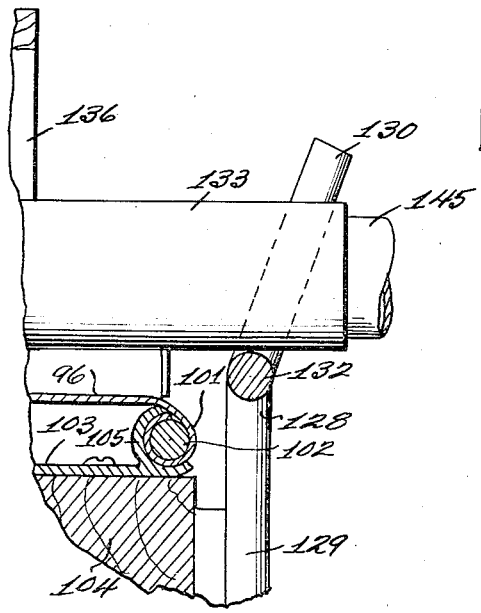
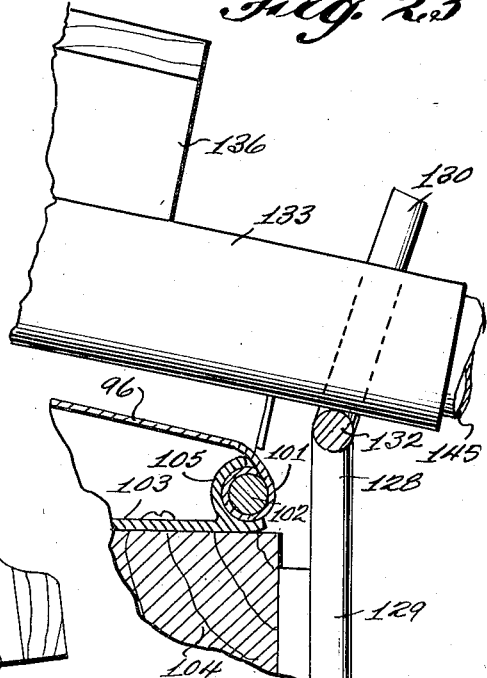
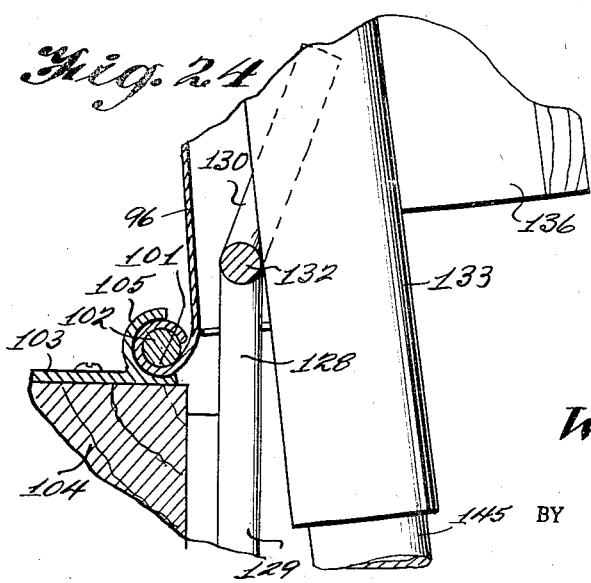
INVENTOR
WILBUR G. HARR
BY Kemmel & Crowell
ATTORNEYS

United States Patent Office 2,845,663
Patented Aug. 5, 1958

2,845,663

FOLDING TRAILER BODY

Wilbur G. Harr, Sciotoville, Ohio, assignor to Sportsman Sleeper, Inc., Portsmouth, Ohio, a corporation of Ohio Application December 11, 1956, Serial No. 627,657

8 Claims. (Cl. 20—2)

The present invention relates to folding trailer bodies, and is a continuation-in-part of my copending application Serial No. 539,512, filed August 29, 1955, entitled Trailer Enclosure.

The primary object of the invention is to provide a folding trailer body which can be erected easily by one man and which can be folded into a compact easily transportable vehicle.

Another object of the invention is to provide a folding trailer in which the roof of the trailer is formed in the shape of a tent when erected and is positioned horizontally when collapsed.

A further object of the invention is to provide a folding trailer body having means associated therewith for carrying a boat when in folded position and which utilizes the boat for assisting in erecting the trailer roof.

A still further object of the invention is to provide a folding trailer of the class described above which is inexpensive to manufacture, simple to use and erect, and which provides complete clamping facilities for hunting trips and vacations.

Other objects and advantages will become apparent in the following specification when considered in the light of the attached drawings, in which:

Figure 1 is a perspective view of the invention, illustrated in folded position.

Figure 2 is a perspective view of the invention, illustrated in erected position.

Figure 3 is a fragmentary transverse cross-section taken along the line 3—3 of Figure 2, looking in the direction of the arrows.

Figure 4 is a fragmentary transverse cross-section taken along the line 4—4 of Figure 1, looking in the direction of the arrows.

Figure 5 is a horizontal cross-section taken along the line 5—5 of Figure 1, looking in the direction of the arrows.

Figure 6 is a fragmentary side elevation.

Figure 7 is a fragmentary perspective view of a detail of the invention, shown partly broken away and in section, for clarity of illustration.

Figure 8 is a fragmentary perspective view of the gunnel catch.

Figure 9 is a fragmentary longitudinal cross-section taken along the line 9—9 of Figure 7, looking in the direction of the arrows.

Figure 10 is a view similar to Figure 9, illustrating the parts in another position.

Figure 11 is a fragmentary perspective view of one of the end walls.

Figure 12 is a fragmentary perspective view of the roof juncture, illustrating the seals therebetween.

Figure 13 is a fragmentary transverse sectional view taken along the line 13—13 of Figure 3, looking in the direction of the arrows.

Figure 14 is a fragmentary transverse sectional view taken along the line 14—14 of Figure 3, looking in the direction of the arrows.

Figure 15 is a fragmentary perspective view of a portion of the roof mounting structure.

Figure 16 is an enlarged fragmentary transverse section taken along the line 16—16 of Figure 15, looking in the direction of the arrows.

Figure 17 is a semi-diagrammatic perspective view of the invention shown attached to a towing vehicle and folded for road transportation.

Figure 18 is a semi-diagrammatic perspective view illustrating the roof panel partially unfolded.

Figure 19 is a semi-diagrammatic perspective view illustrating the roof panels in nearly erected position.

Figure 20 is a semi-diagrammatic rear elevation of the invention illustrating the trailer in erected condition.

Figure 21 is a fragmentary longitudinal section taken along the line 21—21 of Figure 2, looking in the direction of the arrows.

Figure 22 is an enlarged fragmentary transverse cross-section taken along the line 22—22 of Figure 7, looking in the direction of the arrows.

Figure 23 is a view similar to Figure 22, illustrating the parts in a partially elevated condition.

Figure 24 is a view similar to Figures 22 and 23, illustrating the parts in a completely erected condition.

Figure 25 is a transverse fragmentary cross-section of a modified roof panel illustrating insulation secured thereon.

Referring now to the drawings in detail wherein like reference characters indicate like parts throughout the several figures, the reference numeral 30 indicates generally a trailer constructed in accordance with the invention.

The trailer 30 includes a pair of spaced parallel ground engaging wheels 31 mounted on opposite ends of an axle 32. A pair of elliptical leaf springs 33 are mounted on the axle 32 adjacent the spaced apart wheels 31 and support a frame, generally indicated at 34, thereon.

The frame 34 comprises a plurality of cross members 35, a plurality of longitudinally extending members 36, and a pair of converging draft bar members 37. The cross members 35 and longitudinal members 36 are welded together in a generally rectangular framework 34 supported on the springs 33 and have the draft bar members 37 secured thereto and converging forwardly therefrom with a conventional trailer coupling 38 mounted on the forward end thereof.

The frame members 35 and 36 are formed of angle iron and support a floor 39 therein, as best shown in Figure 3. A pair of spaced parallel side panels 40 and 41 extend upwardly from the floor 39, as best shown in Figures 3 and 4. A front wall 42 extends between the forward end portions of the side walls 40 and 41 and upwardly from the floor 39.

A pair of vertically extending spaced parallel angle iron corner posts 43 and 44 extend upwardly from the frame members 35 and 36 enclosing the vertical corners between the side walls 40 and 41 and the front wall 42, respectively.

Wheel wells 45 and 46 are formed in opposite sides of the trailer 30 overlying the wheels 31. Wheel well boxes 47 and 48 enclose the wheel wells 45 and 46, respectively, to close the interior of the trailer 30.

A transverse horizontal angle iron frame member 49 extends between the corner posts 43 and 44 adjacent the top edge 50 of the front wall 42 with one leg 51 of the angle iron 49 extending upwardly along the face of the front wall 42, and the other leg 52 thereof extending perpendicularly forwardly from the front wall 42 at a point spaced well below the top edge 50 thereof.

A pair of upwardly extending spaced apart parallel rear corner posts 53 and 54 extend upwardly from the frame members 35 and 36 perpendicularly thereto. A pair of rear wall panels 55 and 56 are supported on the rear cross members 35 and by the corner posts 53 and 54 with their inner edges 57 and 58, respectively, arranged in substantially spaced apart parallel relation.

The side walls 40 and 41, front wall 42, and rear wall members 55 and 56 are secured to the frame members 35 and 36 and the corner posts 43, 44, 53 and 54 by suitable means, such as bolts, rivets, screws and the like.

A pair of horizontal frame members 59 and 60 are positioned at the top edges of the wall sections 55 and 56 and are provided with downwardly spaced rearwardly extending flanges 61 and 62, respectively.

A pair of longitudinally extending spaced apart parallel angle iron frame members 63 and 64 are positioned in overlying relation to the upper edges of the side walls 40 and 41 with one of the respective flanges of each thereof extending inwardly in overlying relation to the walls 40 and 41. The angle iron frame members 63 and 64 are secured to the corner posts 43—53, 44—54, respectively, to form a rigid frame. An angle iron frame member 65 is positioned beneath the rear wall sections 55 and 56 and secured to the angle iron transverse frame members 35 lying thereabove.

A conventional trailer jack 66 is secured to the forward end of the converging draft bars 37 to support the trailer 30 when uncoupled from a towing vehicle 67. A pair of adjustable supports 68 are arranged in spaced parallel relation at the rear of the trailer 30 and comprise tubes 69 secured to the transverse member 35 and the frame member 65 at their lower ends and to the flanges 61 and 62 of the frame members 59 and 60 at their upper ends. The tubes 69 have telescopically positioned therein rods 70 having feet 71 secured to their lower ends. Clamp bolts 72 extend through the tubes 69 and clamp against the rods 70 to secure them in adjusted position.

The frame 34, sides 40 and 41, front wall 42, and rear wall sections 55 and 56 form a generally rectangular box having an open top.

Referring now to Figures 3, 4, 11, 13 and 14, a generally triangular upper front end wall 73 is hingedly secured to the upper end portion of the front wall 42 by a pair of offset hinges 74 arranged in spaced apart relation. The upper front wall 73 is provided with a transversely extending horizontal angle iron frame member 75 secured along the lower edge thereof, as best seen in Figure 13, and having a resilient seal 76 secured thereto for engaging the top edge of the angle iron frame member 49 to seal the upper front wall 73 to the lower front wall 42.

A second seal 77 is positioned beneath the frame member 75 and secured to the lower front edge of the upper front wall 73 to engage the upper rear edge of the front wall 42, as best seen in Figure 13.

The upper end wall 73 is provided with a plurality of screened windows 78 of conventional construction. The upper front wall 73 is adapted to fold inwardly of the trailer 30 with the upper end thereof extending toward the rear of the trailer 30.

A generally triangular upper rear wall 79 is hingedly secured to the upper edge portions of the rear wall panels 55 and 56 by hinges (not shown) in the same manner that the upper front wall 73 is secured to the front wall 42 and sealed in a like manner. The upper rear wall 79 is provided with a rectangular doorway 80 corresponding in width to the distance between the inner edges 57 and 58 of the rear wall sections 55 and 56. A plurality of screened windows 81 of conventional construction are mounted in the upper rear wall 79 and are provided with adjustable awning closures 82.

A lower door section 83 is connected to the inner edge 57 of the wall section 55 by means of hinges 84 arranged in vertically spaced relation. An upper door section 85 is positioned in the doorway 80 and hinged to the upper rear wall 79 by vertically spaced hinges 86.

A latch 87 mounted on the lower door section 83 secures the door section 83 in closed position in abutting relation to the edge 58 of the wall section 56. The upper door section 85 is detachably connected to the lower door section 83 so that the door sections 83 and 85 will swing together when the latch 87 is released with the upper rear wall 79 in erected position. The upper rear wall 79 is adapted to fold inwardly with its upper end directed forwardly of the trailer 30 with the upper door section 85 disconnected from the lower door section 83, thus permitting the lower door section 83 to be opened on its hinges 84 when the upper rear wall 79 is in folded position.

A roof panel 88 comprises a plurality of transversely extending sheets 89 and have parallel upstanding flanges 90 formed on opposite side edges thereof. The flanges 90 on each sheet 89 are provided with offset end portions 91 arranged in parallel relation to the sheet 89 and arranged in inwardly facing relation.

A C-shaped connector 92 overlies adjacent flanges 90 of adjacent sheets 89 and engages under the offset portions 91 of adjacent flanges 90 to lock the sheets 89 together, as best shown in Figure 14. A longitudinally extending angle iron frame member 93 extends along the free edge of the panel 88 with one leg 94 thereof underlying the panel 88, and the other leg 95 thereof extending vertically across the ends of the flanges 90, as best seen in Figure 12.

A second roof panel 96 is formed of a plurality of sheets 89 of identical construction to the sheets 89 in the roof panel 88. The roof panel 96 is also provided with a longitudinally extending angle iron frame member 97 having one leg 98 thereof positioned beneath the free end portion of the panel 96, and the other leg 99 thereof extending vertically along the edges of the flanges 90.

The connector 92 is provided with a downwardly extending integral flat end portion 100 overlying the ends of the flanges 90 opposite the angle iron frame members 93 and 97. The lateral edges of the panels 88 and 96 are provided with an integral rolled hinge pintle 101 formed about a hardwood core 102 and extending below the sheet 89.

A continuous stationary hinge base 103 is secured to the top of the frame member 63 and extends from the front to the rear of the trailer 30. The frame member 64 is provided with a vertical spacer block 104 secured to the top edge thereof and has a hinge base 103 secured thereto extending from the front to the rear edge of the trailer 30. The hinge bases 103 are provided with an arcuate socket 105 extending continuously therealong and opening outwardly away from the center of the trailer 30. The hinge pintle 101 is positioned in the socket 105 so that the roof panels 88 and 96 may be hinged with relation to the sides 40 and 41 of the trailer 30.

The roof panel 88 is adapted to fold inwardly of the trailer 30 in overlying relation to the inwardly folded upper front wall 73 and the inwardly folded upper rear wall 79. The roof panel 96 is adapted to fold in overlying relation to the roof panel 88, and due to the spacer block 104 lies in a horizontal plane thereon.

A valance 106 is secured to the front edge portion of the roof panel 88 and has an offset upper flange 107 overlying the forward flange 90 of the roof panel 88. A similar valance 108 is secured to the rear end of the roof panel 88.

A valance 109 is secured to the rear edge of the roof panel 96 and is provided with an inturned flange 110 along its upper edge overlying the flange 90 at the rear edge of the roof panel 96. A similar valance 111 depends from the forward edge of the roof panel 96. The longitudinal edge of the roof panel 96 having the frame member 97 secured thereto is provided with a longitudinally extending valance 112 having an inturned flange 113 integrally formed thereon and overlying the terminal end portions of the sheets 89.

The valance 112 is aligned with the valances 109 and 111 and extends therebetween. The valances 106 and 108 overlie the upper end walls 73 and 79, respectively, when the trailer is in erected position and extend downwardly to a point just above the leg 52 and flanges 61 and 62, respectively, when the trailer is in folded position.

The valances 109, 111 and 112 are somewhat longer than the valances 106 and 108 and similarly overlie the upper end walls 73 and 79 when the trailer is erected and extend downwardly to the leg 52 and the flanges 61 and 62 when the trailer is folded. The valances 106, 108, 109, 111 and 112 assist in providing a finished appearance for the trailer 30 as well as assisting in the sealing of the trailer 30.

In Figure 11 of the drawings, an enlarged detail perspective of the end wall 73 is illustrated, and it should be understood that the end wall 79 is constructed identically thereto with respect to the features illustrated in Figure 11.

Angle iron frame members 114 and 115 are secured to the outside face of the end wall 73 and have one flange 116, 117, respectively, thereof extending perpendicularly forwardly of the forward face of the end wall 73.

A flexible sealing strip 118 is secured to the flanges 116 and 117 and projects forwardly therebeyond. A second rubber strip 119 is secured to the inner peripheral edge of the upper front wall 73 and extends vertically thereabove to engage the inner surface of the roof panels 88 and 96, as best illustrated in Figure 14. The flexible strip 118 engages the inner face of the valance 106 and the valance 111 to provide an additional seal therebetween.

As stated before, the upper rear wall 79 is sealed to the roof panels 88 and 96 in an identical manner to the sealing of the upper front wall 73.

As best shown in Figure 12, a flexible rubber sealing strip 120 is secured to the leg 94 of the angle iron frame member 93 on the roof panel 88 and extends therebeyond to engage the undersurface of the roof panel 96 to seal the apex joint between the roof panels 88 and 96.

To secure the end walls 73 and 79 in erected position with relation to the roof panels 88 and 96, a pair of cords 121 and 122 are provided at each end of the roof panel 88. The cords 121 and 122 are identical and their method of mounting is likewise identical.

In Figure 21, the cord 121 is illustrated as attached to the roof panel 88 by the attaching element 123 at the forward edge of the roof panel 88. A cleat 124 is positioned on the inner surface of the upper rear end wall 79 below the apex thereof and the cord 121 extends inwardly over the top of the upper end wall 79 and is detachably secured to the cleat 124 to hold the upper end wall 79 in position.

A coil spring 125 depends from the end of the cord 121 and has a hook 126 formed in the free end thereof for engagement with an eye 127 secured to the roof panel 88 to hold the cord 121 against the roof panel 88, while the upper rear wall 79 is being erected and/or folded.

A pair of forks 128 are positioned in longitudinally spaced relation adjacent the longitudinal member 64 of the trailer 30. The forks 128 are each provided with a vertically extending shank 129 and a pair of spaced apart upstanding arms 130 and 131. The shank 129 and arms 130, 131 are integrally joined by means of an arcuate saddle 132.

A tubular lever 133 has one end supported on the arcuate saddle 132 in spaced relation to the roof panel 96, and the opposite end thereof secured to the roof panel 96 by means of a bracket 134 secured by fastening elements 135 to the sheet 89 of the roof panel 96 and to the angle iron member 97.

The lever members 133 extend at a slight angle upwardly from the bracket 134 to the saddle 132 and are slightly spaced from the sheet 89 of the roof panel 96 throughout most of its length.

An angle iron boat support 136 is secured to the tubular lever 133 by welding or the like along the free edge of one leg 137 with the other leg 138 thereof extending horizontally from the upper edge thereof. A cushion slat 139 is secured to the horizontal leg 138 in overlying relation thereto. The cushion slat 139 is provided with blocks 140 which are provided to engage the inner edges of the gunnels of a boat 141 which rests in embedded position on the cushion slat 139, as best seen in Figure 1. An adjustable pin 142 is secured to the leg 137 of the support 136 by means of a bolt 143 extending through any one of a plurality of holes 144 formed in the leg 137.

A tubular slide 145 is telescopically positioned in the lever 133 and projects therefrom adjacent the ends thereof supported on the saddle 132. The tubular slide 145 is provided with an upstanding foot 146 secured to its outer end by welding or the like. A clamp screw 147 is threaded through the tubular lever 133 and is adapted to extend through an opening 148 in the tubular slide 145 to clamp the tubular slide 145 to the internal surface of the tubular lever 133, as shown in Figure 9.

The opening 148 in the tubular slide 145 is arranged for engagement by the clamp screw 147 when the tubular slide 145 is in retracted position completely within the tubular lever 133.

As illustrated in Figure 10, the clamp screw 147 engages the outer surface of the tubular slide 145 to lock the tubular slide 145 to the tubular lever 133 in any extended position thereof. A handle 149 is mounted on the outer end of the clamp screw 147 to facilitate its operation.

It should be understood that the tubular members 69, rods 70, and clamping screws 72 on the rear of the trailer 30 are formed identically to the structure illustrated in Figures 9 and 10.

Referring now to Figure 18, a flexible line 150 is secured to the free edge of the roof panel 96 at one end and to the side wall 40 at the other end to limit the upper movement of the roof panel 96 to prevent damage to the hinge 103.

A flexible line 151 has its opposite ends secured to spaced points along the longitudinal edge of the roof panel 96 with its intermediate portions threaded through openings 152 in the angle member 93. The openings 152 are smooth so that the flexible line 151 can move readily therethrough without undue friction therewith.

A pair of adjustable hold down clamps 153 are secured to the rear of the trailer 30 and are adapted to engage the rear of the boat 141 to secure the boat 141 to the trailer 30. Similar adjustable hold down clamps (not shown) are provided at the front end of the trailer for similarly securing the front of the boat 141.

In Figure 25 a modified structure is illustrated wherein the sheets 89 are provided with a sheet of insulating material 154 positioned thereagainst and secured beneath the offset end portions 91 beneath the clips 92. The insulating sheets 154 may be formed of any desired material and can be added to the roof panels 88 and 96 when desired.

In the use and operation of the invention, the trailer 30 is folded in the position illustrated in Figure 1, with the boat 141 secured thereto by the clamp members 153 for transport from place to place. On arriving at the camping site, the trailer 30 is disconnected from the towing vehicle 67 and the feet 71 are dropped into contact with the ground by releasing the clamping screws 72. The jack 66 is then actuated to level the trailer 30 and to stabilize it with relation to the wheels 31.

The clamping screws 147 are then released permitting the tubular slides 145 to be moved substantially all of the way out of the tubular levers 133. The clamping screws 147 are then tightened down locking the tubular slides 145 in extended position with relation to the tubular levers 133. The boat clamps 153 are then released and the boat 141 is shifted on the cushion slat 139 until the side of the boat is brought into engagement with the feet 146 with the edge of the boat resting against the tubular slide 145.

In this position the opposite side of the boat engages the pins 142 which lock the boat 141 to the cushion slats 139. With the boat 141 in the position above described, slight downward pressure on the outer edge thereof will cause the levers 133, fulcrumed in the saddles 132, to lift the roof panel 96 from its free edge portion by means of the brackets 134 with the roof panel 96 pivoting in the hinge 103. The flexible line 150 limits the upward movement of the roof panel 96 and the boat 141 maintains the roof panel 96 in generally erect position.

The roof panel 88 is then erected by pulling outwardly on the lower end of the flexible line 151 so that it will slide through the opening 152 to raise the panel 88 into erect position. The connection of the line 151 to the panel 96 pulls the roof panel 96 into contacting engagement with the upper edge of the roof panel 88 to the positions illustrated in Figures 3 and 12.

The line 151 is then temporarily secured to support the roof panels 88 and 96 in erected position while the upper front wall 73 and the upper rear wall 79 are being erected. The upper rear wall 79 is swung to erect position with the seals (not shown) thereof in engagement with the roof panels 88 and 96.

The securing line 121 is then attached to the cleat 124 locking the upper rear wall 79 in erected position. The upper front wall 73 is then erected and locked with its line 122 in a similar manner. The upper and lower door sections 85 and 83 are then secured together by detachable securing elements (not shown) and the boat 141 is lifted off the roof panel 96. The tubular slides 145 are then retracted into the tubular levers 133 and the erection of the trailer 30 is complete.

In folding the trailer 30, the reverse procedure is followed utilizing the boat 141 as a counterweight for the roof panel 96 to prevent the roof panel 96 from being lowered too rapidly.

A counterweight (not shown) of any desired construction can be supported on the tubular slides 145 in contact with the feet 146 in place of the boat 141 should the elimination of the boat 141 be desirable.

It can be readily seen from the construction of the trailer 30 and its operation, as described above, that the folding and unfolding operation can be readily accomplished by one person without undue strain.

Having thus described the preferred embodiment of the invention, it should be understood that numerous structural modifications and adaptations may be resorted to without departing from the scope of the appended claims.

What is claimed is:

1. A folding camping trailer comprising a horizontal frame, a floor secured to said frame, a pair of rectangular spaced parallel side walls secured to the side edges of said floor and extending upwardly therefrom, a rectangular front wall secured to the front edge of said floor and the front edges of said side walls, a rectangular rear wall secured to the rear edge of said floor and to the rear edges of said side walls, a triangular upper front wall having its lower edge hingedly secured to the upper edge of said front wall, said triangular upper front wall being foldable to a horizontal plane overlying said floor, a triangular upper rear wall having its lower edge hingedly secured to the upper edge of said rear wall, said triangular upper rear wall being foldable to a horizontal plane overlying said floor, a first rectangular roof panel having one edge thereof hingedly secured to the upper edge of one of said side walls, and a second rectangular roof panel having one edge thereof hingedly secured to the upper edge of the other of said side walls, said roof panels when in erected position engaging at their opposite ends the opposite edges respectively of said triangular upper front and rear end walls with said first roof panel having the free edge opposite the hinged edge thereof engaged over the free edge opposite the hinged edge of said second roof panel, said roof panels being foldable to a horizontal position overlying said upper front and rear end walls when folded with said first roof panel completely overlying said second roof panel and engaging over the upper edges of said front and rear end walls and said other side wall.

2. A device as claimed in claim 1 wherein said first roof panel is provided with movable supporting members for supporting a counterweight with respect to said first roof panel whereby said first roof panel can be raised from horizontal to erected position.

3. A device as claimed in claim 1 wherein means are provided on said first roof panel for lifting the second roof panel to erected position into engagement with said first roof panel.

4. A device as claimed in claim 1 wherein transversely extending means are provided on said first roof panel for supporting a boat thereon with said first roof panel in horizontal position.

5. A device as claimed in claim 1 wherein said first roof panel is provided with a peripheral flange engaging over the free edge of said second roof panel when in erected position and over the end walls and the other side wall of said trailer when in folded position.

6. A device as claimed in claim 1 wherein flexible resilient sealing means is carried by said triangular upper end walls for sealing engagement with said roof panels, and flexible resilient sealing means is carried on the longitudinal edge of said second roof panel for engagement with said first roof panel.

7. A device as claimed in claim 1 wherein flexible resilient sealing means is provided between said triangular upper end walls and said end walls adjacent the hinged connection therebetween.

8. A device as claimed in claim 1 wherein said triangular upper rear end wall and said rear end wall to which it is hingedly secured are each provided with a vertically extending opening with said openings vertically aligned, a lower door section hingedly secured in the opening in said rear end wall, an upper door section hingedly secured in the opening in said upper rear end wall, and means detachably securing said door sections together with said upper rear end wall erected whereby on folding of said upper rear end wall said lower door section is freed from said upper door section and said lower door section provides access into said trailer when folded.

References Cited in the file of this patent

UNITED STATES PATENTS

| | | |
|---|---|---|
| 1,850,638 | Schioler | Mar. 22, 1932 |
| 2,082,273 | Conkey | June 1, 1937 |
| 2,245,465 | Cole | June 10, 1941 |
| 2,604,671 | Sherman | July 29, 1952 |
| 2,626,832 | Guthoerl | Jan. 27, 1953 |
| 2,640,721 | Kors | June 2, 1953 |
| 2,678,442 | Ensor | May 11, 1954 |
| 2,725,602 | Francis | Dec. 6, 1955 |
| 2,765,499 | Couse | Oct. 9, 1956 |
| 2,783,079 | Kurka | Feb. 26, 1957 |

FOREIGN PATENTS

| | | |
|---|---|---|
| 676,997 | Great Britain | Aug. 6, 1952 |